US012811077B2

(12) United States Patent
Perrin et al.

(10) Patent No.: US 12,811,077 B2
(45) Date of Patent: Nov. 24, 2026

(54) CONTROL MECHANISM FOR A CURRENT SWITCHING DEVICE

(71) Applicant: Schneider Electric Industries SAS, Rueil Malmaison (FR)

(72) Inventors: Denis Perrin, Saint Nicolas de Macherin (FR); Sindie Million, Grenoble (FR); Qiyou Xu, Shanghai (CN)

(73) Assignee: Schneider Electric Industries SAS, Rueil Malmaison (FR)

( * ) Notice: Subject to any disclaimer, the term of this patent is extended or adjusted under 35 U.S.C. 154(b) by 325 days.

(21) Appl. No.: 18/656,684

(22) Filed: May 7, 2024

(65) Prior Publication Data

US 2024/0387122 A1 Nov. 21, 2024

(30) Foreign Application Priority Data

May 19, 2023 (FR) ....................................... 2304975

(51) Int. Cl.
*H01H 21/22* (2006.01)
*H01H 21/36* (2006.01)

(52) U.S. Cl.
CPC ............ *H01H 21/22* (2013.01); *H01H 21/36* (2013.01)

(58) Field of Classification Search
CPC ...... H01H 3/3015; H01H 3/30; H01H 3/3026; H01H 3/3031; H01H 3/60; H01H 33/666;
(Continued)

(56) References Cited

U.S. PATENT DOCUMENTS 3,832,504 A * 8/1974 Cellerini .................. H01H 3/30 200/400
4,612,523 A * 9/1986 Mercer .................. H01H 71/58 335/26

(Continued)

FOREIGN PATENT DOCUMENTS

EP 2204828 A1 7/2010
EP 3657522 A1 5/2020

(Continued)

OTHER PUBLICATIONS

French Search Report and Written Opinion dated Dec. 8, 2023 for corresponding French Patent Application No. FR2304975, 9 pages.

*Primary Examiner* — Ahmed M Saeed
(74) *Attorney, Agent, or Firm* — Kinney & Lange, P.A.

(57) ABSTRACT

A mechanism for controlling a current switching device. The mechanism includes: an arming lever; an arming disc secured to an arming shaft, movable between a first position and a second position; and a loading pawl which can pivot between a position in which the arming lever drives the arming disc via the loading pawl and a position in which the arming lever is free, rotation of the arming lever causing the arming disc to go from the first position to the second position whilst constraining an elastic member. The mechanism further includes: an end stop for retaining the arming disc; a closing lever configured to trigger closing of the current switching device; and an elastic member configured to move the loading pawl from the position in which the arming lever drives the arming disc to the position in which the arming lever is free when the arming disc is retained by the end stop whilst driving the closing lever so as to close the current switching device.

13 Claims, 5 Drawing Sheets

(58) Field of Classification Search
CPC ....... H01H 11/0006; H01H 2003/3068; H01H 2003/3073; H01H 2003/3078; H01H 2003/3094; H01H 2011/0093; H01H 3/3042; H01H 3/3047; H01H 3/3052; H01H 71/1009; H01H 71/503; H01H 71/505; H01H 71/528; H01H 9/20
See application file for complete search history.

(56) References Cited

U.S. PATENT DOCUMENTS

| | | | | |
|---|---|---|---|---|
| 4,695,690 | A * | 9/1987 | Banfi | H01H 77/104 218/32 |
| 5,889,250 | A * | 3/1999 | Castonguay | H01H 3/3021 200/50.01 |
| 2002/0092752 | A1* | 7/2002 | Marin-Pache | H01H 3/30 200/400 |
| 2009/0173611 | A1* | 7/2009 | Suter | H01H 3/3026 200/336 |
| 2013/0186231 | A1* | 7/2013 | Belin | H01H 3/3015 74/568 R |

FOREIGN PATENT DOCUMENTS

| | | | |
|---|---|---|---|
| FR | 2938692 | A1 | 5/2010 |
| FR | 2940850 | A1 | 7/2010 |
| FR | 3089049 | A1 | 5/2020 |

* cited by examiner

CONTROL MECHANISM FOR A CURRENT SWITCHING DEVICE

TECHNICAL FIELD

The present invention relates to the field of current switching devices for a medium-voltage distribution electrical device rated at a voltage between 1 kV and 52 kV inclusive. It more particularly concerns a mechanism controlling closing and opening of such a current switching device. The electrical device may be a switch for example. The electrical device may also be a circuit breaker or a disconnector.

PRIOR ART

A medium-voltage electrical device, such as a switch, includes a mobile contact for each phase of the network. When the current is interrupted the mobile contacts are moved away from fixed contacts facing the mobile contacts so that the current is switched. In order to close the circuit to enable the electrical current to flow a control mechanism enables triggering of the movement of the mobile contacts. This movement of the mobile contacts must be effected within at most a few milliseconds in order to prevent the creation of an electrical arc on closing the circuit as well as when opening the circuit. To obtain the speed of movement of the contacts corresponding to these durations of movements the opening and closing mechanism includes springs that are constrained in an arming phase and then released in order to supply the energy necessary for moving the mobile elements.

The mechanical forces in play during the movement of the various mobile parts of the mechanism can cause wear of the mechanism on opening and on closing, which compromises the service life of the electrical device.

It is therefore desirable to have a control mechanism for closing and opening a current switching device having improved mechanical reliability and an increased service life.

SUMMARY

To this end the invention proposes a closing and opening control mechanism of a current switching device, the mechanism including:

- an arming lever,
- an arming shaft pivoted on a frame,
- a first elastic member including a closing spiral spring having a central end fastened to the arming shaft and a peripheral end fastened to a control member connected to the current switching device,
- an arming disc fastened to the arming shaft mobile between a first position called the rest position and a second position called the arming position,
- a loading pawl pivoted on the arming disc, the loading pawl being able to go from a first position called the driving position in which the arming lever drives the arming disc via the loading pawl to a second position called the free position in which the arming lever is free to rotate relative to the arming disc, in which mechanism rotation of the arming lever in a first rotation direction called the arming direction causes the arming disc to go from the first position to the second position, constraining the first elastic member,
- a retaining end stop configured to retain the arming disc once the arming disc has reached the second position and the torque applied to the arming disc by the arming lever becomes less than the torque supplied by the first elastic member,
- a fastening device mobile between a first position in which the control member is held immobile and a second position in which the control member is able to move because of the action of the closing spiral spring,
- a closing lever pivoted on the frame configured to cause the fastening device to go from the first position to the second position and thereby to cause closing of the current switching device,
- a second elastic member configured to cause the loading pawl to go from the driving position to the free position when the arming disc is retained by the retaining end stop, in which mechanism the loading pawl is configured to drive the closing lever from the first position to the second position when the loading pawl goes from the driving position to the free position so as to cause closing of the current switching device.

When the arming lever has turned sufficiently the arming disc bears on the retaining end stop. The force applied by the first elastic member is therefore taken up by the retaining end stop. The force exerted by the arming lever on the loading pawl therefore decreases until it is virtually cancelled out, since the tension of the first elastic member is taken up by the end stop. The force exerted by the second elastic member on the loading pawl then becomes greater than the retaining force exerted by the arming lever and so the charging pawl pivots relative to the arming disc and causes the closing lever to pivot. The closing lever moves the fastening member of the control member and frees the control member, which is moved because of the action of the closing spring. The movement of the control member causes the rotation of the mobile electrical contacts of the current switching device. The electrical circuit is therefore closed and enables the flow of current in the electrical device. As the arming disc is fixed and in contact with the retaining end stop when the closing of the current switching device is triggered there are no mechanical impacts between the arming disc and the retaining end stop during the closing phase. The stresses on the mobile parts are reduced and this increases their service life. The durability of the control mechanism is improved.

The features listed in the following paragraphs can be used independently of one another or in all technically possible combinations:

The frame is a frame of the control mechanism of the current switching device.

The arming disc and the arming shaft form a rigid assembly.

The assembly comprising the arming disc and the arming shaft is mobile between a first position called the rest position and a second position called the arming position.

The first elastic member further includes an opening spiral spring having a central end fastened to the arming shaft and a peripheral end fastened to the frame.

The opening spiral spring and the closing spiral spring are both elastically constrained when the rotation of the arming lever causes the arming disc to move from the first position called the rest position to the second position called the arming position.

The retaining end stop is configured to retain the arming disc when the arming disc has reached the second position and the torque applied to the arming disc by the arming lever becomes less than the torque supplied by the opening spiral spring and the closing spiral spring.

The closing lever is able to move from a first position called the rest position in which the fastening device retains the control member so that electrical current does not circulate in the current switching device to a second position called the closing position in which the fastening device frees the control member so that the current switching device is placed in a configuration in which electrical current is able to circulate in the current switching device.

The fastening device of the control mechanism for closing and opening a current switching device includes a rocker pivoted on the frame, the rocker being mobile between a position retaining the control member and a position freeing the control member, and the rocker is connected to the closing lever by a connecting link.

The control mechanism includes a closing disc fastened to the control member and pivoted on the arming shaft pivot.

The closing spiral spring has a central end fastened to the arming shaft and a peripheral end fastened to the control member. The closing disc includes a retaining roller.

The fastening device includes an activation lever that is able to rotate about an axis.

The activation lever is configured selectively to retain the closing disc in position against the effect of the closing spiral spring or to free the closing disc so as to enable its rotation because of the effect of the closing spring.

To this end a first end of the activation lever is configured to be in contact with the closing disc and a second end of the activation lever is configured to be in contact with the rocker.

In accordance with one aspect of the control mechanism the loading pawl includes a first thrust area configured to constrain the second elastic member when the arming disc goes from the first position to the second position.

The second elastic member is therefore able to exert sufficient force to cause the loading pawl to pivot once the arming disc is retained by the retaining end stop.

The first thrust area is at a distance from the second elastic member when the arming disc is in the first position called the rest position.

The first thrust area is at a distance from the second elastic member over a first part of the movement of the arming disc from the first position called the rest position to the second position called the arming position.

In accordance with another aspect of the control mechanism the loading pawl includes a second thrust area configured to drive the closing lever when the loading pawl goes from the driving position to the free position.

The first thrust area is formed by a first portion of a hook projecting from a body of the loading pawl.

The second thrust area is formed by a second portion of the hook projecting from the body of the loading pawl.

The first thrust area and the second thrust area are disposed on opposite edges of the hook projecting from the body of the loading pawl.

In accordance with one embodiment of the control mechanism the closing lever includes a bearing area configured to receive thrust from the second thrust area of the loading pawl because of the action of the second elastic member.

In accordance with one embodiment the bearing area of the closing lever lies in a plane parallel to the pivot axis of the closing lever.

In accordance with one aspect of the control mechanism the pivot axis of the loading pawl relative to the arming disc is parallel to the pivot axis of the arming disc.

In accordance with one aspect of the control mechanism the distance between a distal end of the hook projecting from the body of the loading pawl and the pivot axis of the arming disc is less than the distance between the distal end of the hook projecting from the body of the charging pawl and the pivot axis of the loading pawl relative to the arming disc.

This arrangement enables the arming disc to go from the rest position to the arming position without the loading pawl touching the closing lever, while enabling the loading pawl to enter into contact with the closing lever and to cause the latter to pivot when the loading pawl pivots from the driving position to the free position.

In accordance with one embodiment of the control mechanism the loading pawl includes a housing configured to receive a driving pin of an arming lever so as to drive the loading pawl and to cause the arming disc to go from the first position to the second position.

The presence of the housing and the pivot connection between the loading pawl and the arming disc enable selective engagement of the arming lever with the loading pawl.

The housing includes an engagement wall extending in a direction substantially radial relative to the arming disc, the driving pin being in contact with the engagement wall when the loading pawl is driven.

The engagement wall extends in a direction substantially perpendicular to a straight line segment joining the engagement wall and the pivot axis of the loading pawl relative to the arming disc. The engagement wall extends in a direction substantially parallel to the direction in which the driving pin extends.

Thus the friction force between the driving pin and the loading pawl exerts a high retaining torque on the loading pawl relative to the arming disc which tends to prevent pivoting of the loading pawl relative to the arming disc. This enables the driving pin to remain in contact with the loading pawl throughout the movement of the latter.

In accordance with one embodiment of the control mechanism the second elastic member is a torsion spring.

The second elastic member is for example coaxial with the closing lever.

In accordance with one embodiment the second elastic element is preconstrained when mounted.

In accordance with one embodiment of the control mechanism the arming disc includes a roller configured to roll along the perimeter of a fastening lever when the arming disc goes from the first position to the second position, the retaining end stop being defined by a portion of the perimeter of the fastening lever on which the roller is able to come to bear.

The profile imparted to the perimeter of the fastening lever enables creation of a retaining end stop that does not limit the movement of the arming disc when the latter goes from the rest position to the arming position but prevents the arming disc from returning to the rest position once the arming position is reached.

The rotation axis of the roller of the arming disc is parallel to the rotation axis of the arming disc.

The portion of the perimeter of the fastening lever forming a retaining end stop for the roller of the arming disc extends in a direction substantially parallel to the radial direction of the arming disc.

The control mechanism includes an anti-rotation end stop configured to immobilise rotation of the fastening lever when the arming disc goes from the first position to the second position.

In accordance with one embodiment of the control mechanism the rotation shaft of the roller of the arming disc is able to slide in a slot in the arming disc, constraining a return elastic member.

In accordance with one embodiment of the control mechanism the arming lever includes a rod configured to be engaged coaxially in the arming shaft.

The arming lever includes a pin that extends along an axis parallel to the axis of the arming lever.

The pin is connected to the body of the arming lever by a lateral projection extending perpendicularly to the axis of the arming lever.

In the engagement position of the arming lever the arming lever and the arming shaft are coaxial.

In accordance with one embodiment the arming lever is configured to be driven manually by an operator. The arming lever includes a holding rod extending perpendicularly to the axis of the arming lever.

In accordance with another embodiment the arming lever is driven by an electric motor.

The control mechanism may include a first return spring for the loading pawl configured to retain the loading pawl in the driving position when the arming disc is in the first position called the rest position.

The control mechanism includes a second return spring for the loading pawl configured to retain the loading pawl in the free position when the arming disc goes from the second position to the first position.

The disclosure also concerns a current switching device including a control mechanism as described hereinabove.

The disclosure also relates to an electrical device including a current switching device as described hereinabove, the current switching device being adapted selectively to allow or to prohibit the flow of current in the electrical device.

BRIEF DESCRIPTION OF THE DRAWINGS

Other features, details and advantages will become apparent on reading the following detailed description and analysing the appended drawings, in which.

DESCRIPTION OF EMBODIMENTS

In order to facilitate reading the figures the various elements are not necessarily represented to scale. In the figures identical elements bear the same references. Some elements or parameters may be indexed, that is to say designated for example first element and second element or first parameter and second parameter, etc. The object of this indexing is to distinguish similar but not identical elements or parameters. This indexing does not imply any priority of one element or parameter relative to another and the denominations may be interchanged. When it is specified that a subsystem includes a given element, that does not exclude the presence of other elements in that subsystem.

Figure 1:
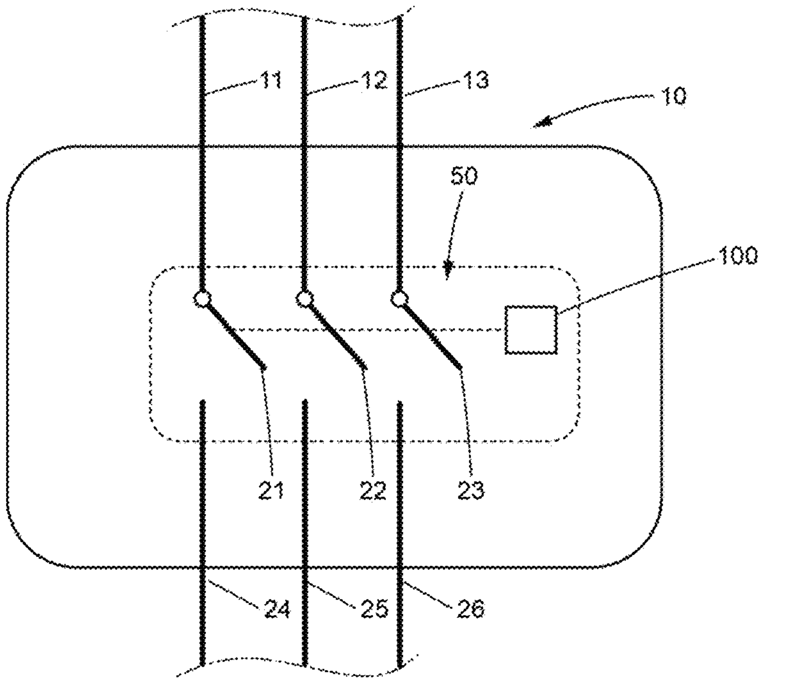
FIG. 1 is a schematic representation of an electrical device incorporating a control mechanism in accordance with the invention.

There has been represented in FIG. 1 an electrical device 10 including a current switching device 50. The current switching device 50 is adapted selectively to allow or to prohibit the flow of current in the electrical device 10.

The electrical device 10 includes three electrical conductors 11, 12, 13 that respectively correspond to the three phases of a medium-voltage electrical circuit. Each electrical conductor 11, 12, 13 includes a respective mobile contact 21, 22, 23 and a respective fixed contact 24, 25, 26. The mobile contacts 21, 22, 23 of the current switching device 50 are mobile in rotation between a position in which the mobile contacts 21, 22, 23 are at a distance from the respective fixed contacts 24, 25, 26 and a position in which the mobile contacts 21, 22, 23 are in contact with the respective fixed contacts 24, 25, 26.

The current switching device 50 includes a control mechanism 100 described hereinafter.

The control mechanism 100 for closing and opening a current switching device 50 includes:

- an arming lever 111,
- an arming shaft 300 pivoted on a frame 200,
- a first elastic member 104 including a closing spiral spring 106 having a central end 106*a* fastened to the arming shaft 300 and a peripheral end 106*b* fastened to a control member 250 connected to the current switching device 50,
- an arming disc 107 fastened to the arming shaft 300 mobile between a first position P1 called the rest position and a second position P2 called the arming position,
- a loading pawl 213 pivoted on the arming disc 107, the loading pawl 213 being able to go from a first position P'1 called the driving position in which the arming lever 111 drives the arming disc 107 via the loading pawl 213 to a second position P'2 called the free position in which the arming lever 111 is free to rotate relative to arming disc 107, rotation of the arming lever 111 in a first rotation direction called the arming direction causing the arming disc 107 to go from the first position P1 to the second position P2 and to constrain the first elastic member 104,
- a retaining end stop 217 configured to retain the arming disc 107 once the arming disc 107 has reached the second position P2 and the torque applied to the arming disc 107 by the arming lever 111 becomes less than the torque supplied by the first elastic member 104,
- a fastening device 80 mobile between a first position in which the control member 250 is held immobile and a second position in which the control member 250 is able to be moved because of the action of the closing spiral spring 106,
- a closing lever 109 pivoted on the frame 200 configured to cause the fastening device 80 to go from the first position to the second position and thereby to cause closing of the current switching device 50,
- a second elastic member 112 configured to cause the loading pawl 213 to go from the driving position P'1 to the free position P'2 when the arming disc 107 is retained by the retaining end stop 217, and the loading pawl 213 is configured to move the closing lever 109 from the first position to the second position when the loading pawl 213 goes from the driving position P'1 to the free position P'2 so as to cause closing of the current switching device 50.

When the arming lever 111 has turned sufficiently during the arming manoeuvre the force applied by the first elastic member 104 can therefore be taken up by the retaining end stop 217 because the arming disc 107 is able to come to bear on the retaining end stop 217. The force exerted by the arming lever 111 on the loading pawl 213 therefore decreases until it is virtually cancelled out. The force exerted by the second elastic member 112 on the loading pawl 213 then becomes greater than the retaining force exerted by the arming lever 111, that retaining force resulting from friction between the arming lever 111 and the loading pawl 213. The loading pawl 213 is therefore able to pivot relative to the arming disc 107 because of the action of the second elastic member 112 and to trigger the rotation of the closing lever 109. The closing lever 109 frees the fastening device 80 which makes it possible to free the control member 250 and to cause rotation of the mobile electrical contacts of the current switching device 50. The electrical circuit is therefore closed, which enables the flow of electrical current in the electrical device 10. As the arming disc 107 is fixed and in contact with the retaining end stop 217 during triggering of the closing of the current switching device 50 there are no mechanical impacts between the arming disc 107 and the retaining end stop 217 during the phase of closing the electrical circuit. The mechanical stresses on the components of the control mechanism 100 are reduced and this increases their longevity. The durability of the control mechanism 100 is improved.

The frame 200 is a frame of the control mechanism 100 of the current switching device 50. The frame 200 is rigid and mechanically supports the various components of the control mechanism 100. The frame 200 is represented schematically in FIG. 8 and is not represented in the other figures.

The arming disc 107 and the arming shaft 300 form a rigid assembly. The arming disc 107 can be fixed to the arming shaft 300 by crimping for example or by welding.

The arming disc 107 takes the general form of an apertured disc. The arming disc 107 lies in a plane perpendicular to the rotation axis D1 of the arming shaft 300. The arming disc 107 is for example formed from flat sheet.

The assembly comprising the arming disc 107 and the arming shaft 300 is mobile between a first position P1 called the rest position and a second position P2 called the arming position.

The arming lever 111 includes a rod 111*d* configured to be engaged coaxially in the arming shaft 300. The cylindrical body 111*a* of the arming lever 111 is extended by the rod 111*d*. The arming shaft 300 includes at one axial end a cylindrical chamber able to receive the rod 111*d*.

Figure 8:
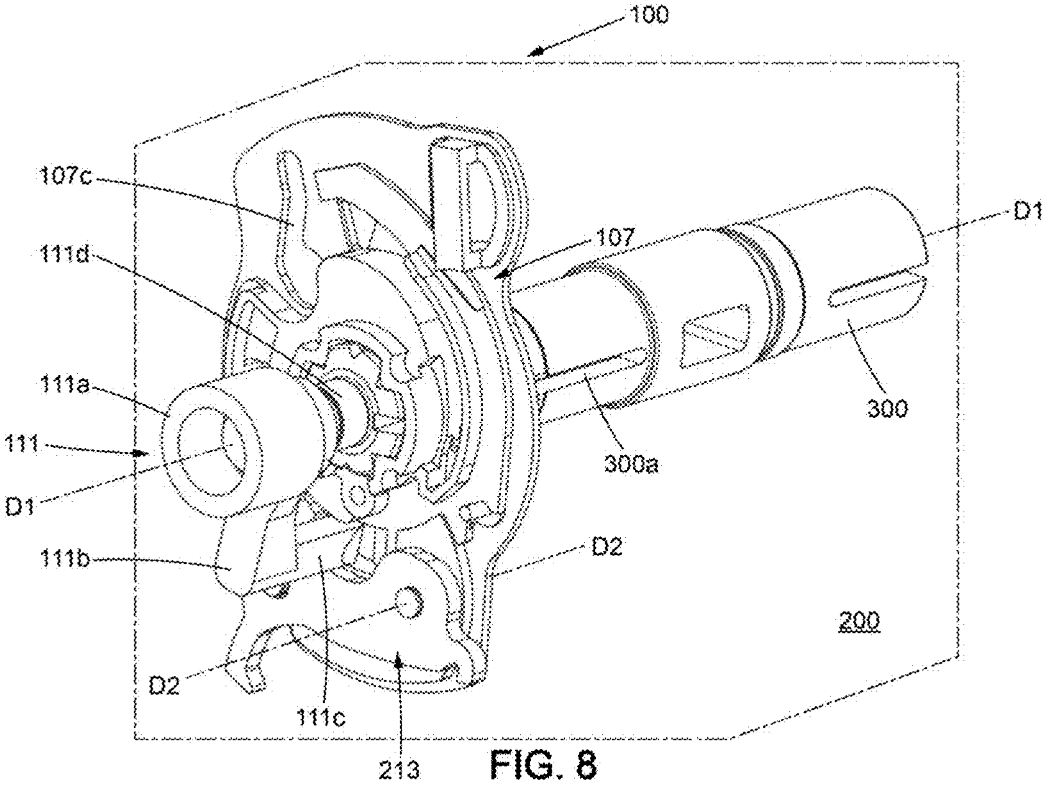
FIG. 8 is a partial perspective view of the control mechanism from FIGS. 2 to 7.

In the engaged position of the arming lever 111 the arming lever 111 and the arming shaft 300 are coaxial, as represented in FIG. 8. The axis D1 is the axis common the arming lever 111 and the arming shaft 300.

The arming lever 111 includes a pin 111*c* that extends along an axis parallel to the axis of the arming lever 111. The axis of the pin 111*c* is at a distance from the axis D1. The pin 111*c* is connected to the body 111*a* of the arming lever 111 by a lateral projection 111*b* extending perpendicularly to the axis of the arming lever 111. The driving pin 111*c* enables the arming disc 107 to be driven in rotation via the loading pawl 213.

In accordance with the embodiment depicted here the arming lever 111 is configured to be driven manually by an operator. If the operator wishes to close the electrical circuit of the electrical device 10 they introduce the arming lever 111 into the arming shaft 300 in order to manoeuvre the control mechanism 100.

The arming lever 111 includes a holding rod extending perpendicularly to the axis of the arming lever 111. The holding rod, which is not represented in the figures, has a length producing a lever arm sufficient for maneuvering the control mechanism 100 to be easy for the operator. Maneuvering the arming lever by means of the holding rod causes the assembly comprising the arming disc 107 and the arming shaft 300 to go from the first position P1 called the rest position to the second position P2 called the arming position. Once the circuit has been closed the arming lever 111 can be disengaged from the arming shaft 300.

According to another embodiment, not represented, the arming lever 111 is driven by an electric motor. In this case the operator activates the electric motor to trigger maneuvering of the control mechanism. The operating principle of the control mechanism 100 remains exactly the same. In this embodiment the arming lever 111 is permanently connected to the arming shaft 300.

The loading pawl 213 is configured to pivot relative to the arming disc 107 about a pivot axis D2. The axis D2 about which the charging pawl 213 pivots relative to the arming disc 107 is parallel to the pivot axis D1 of the arming disc 107.

The loading pawl 213 is immobile in translation relative to the arming disc 107. The loading pawl 213 is plane. The loading pawl 213 is for example formed from flat sheet.

The first elastic member 104 includes a closing spiral spring 106 having a central end 106*a* fastened to the arming shaft 300 and a peripheral end 106*b* fastened to a control member 250.

By stating that two parts are fastened to one another is meant that the two parts are rigidly connected to one another.

Figure 10:
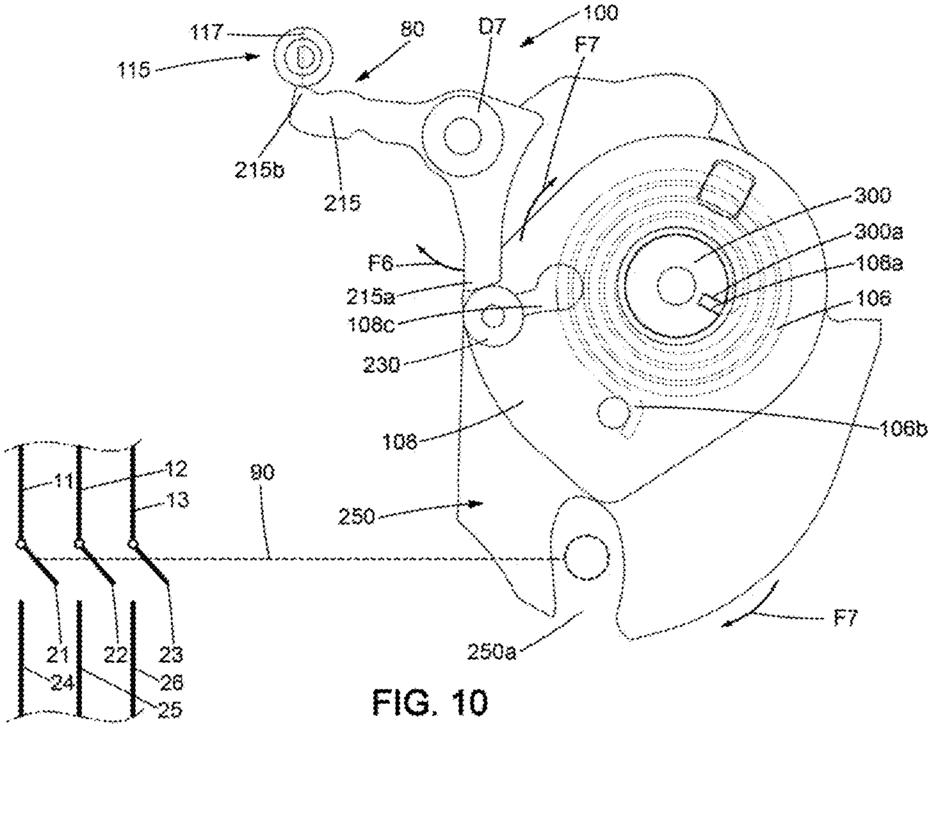
FIG. 10 is a side view of the control mechanism represented in FIG. 9.

As depicted in FIG. 10, the central end 106*a* is inserted in a slot 300*a* extending radially toward the centre of the shaft 300.

The first elastic member 104 further includes an opening spiral spring having a central end fastened to the arming shaft 300 and a peripheral end fastened to the frame 200.

The opening spiral spring and the closing spiral spring 106 are both tensioned during rotation of the arming shaft 300.

The retaining end stop 217 is configured to retain the arming disc 107 once the arming disc 107 has reached the second position P2 and the torque applied to the arming disc 107 by the arming lever 111 becomes less than the torque applied by the opening spiral spring and the closing spiral spring 106.

The closing lever 109 is able to go from a first position P"1 called the rest position in which the fastening device 80 retains the control member 250 so that electrical current does not flow in the current switching device 50 to a second position P"2 called the closing position in which the fastening device 80 frees the control member 250 so that the current switching device 50 is placed in a configuration in which electrical current is able to circulate in the current switching device 50.

In the first position P"1 called the rest position the closing spring 106 remains under constraint. In the second position P"2 called the closing position the closing spring 106 is freed so that the elastic potential energy accumulated by the closing spring 106 during the arming manoeuvre enables actuation of the mobile contacts of the current switching device 50 and therefore closing of the electrical circuit. To this end the mobile contacts 21, 22, 23 each corresponding to one phase of the electrical circuit pivot together so that each comes into contact with a respective fixed contact 24, 25, 26.

The internal components that establish a kinematic connection between the control member 250 and the mobile contacts 21, 22, 23 have not been represented in detail and are schematically represented in FIG. 10 by the dashed line 90.

Figure 9:
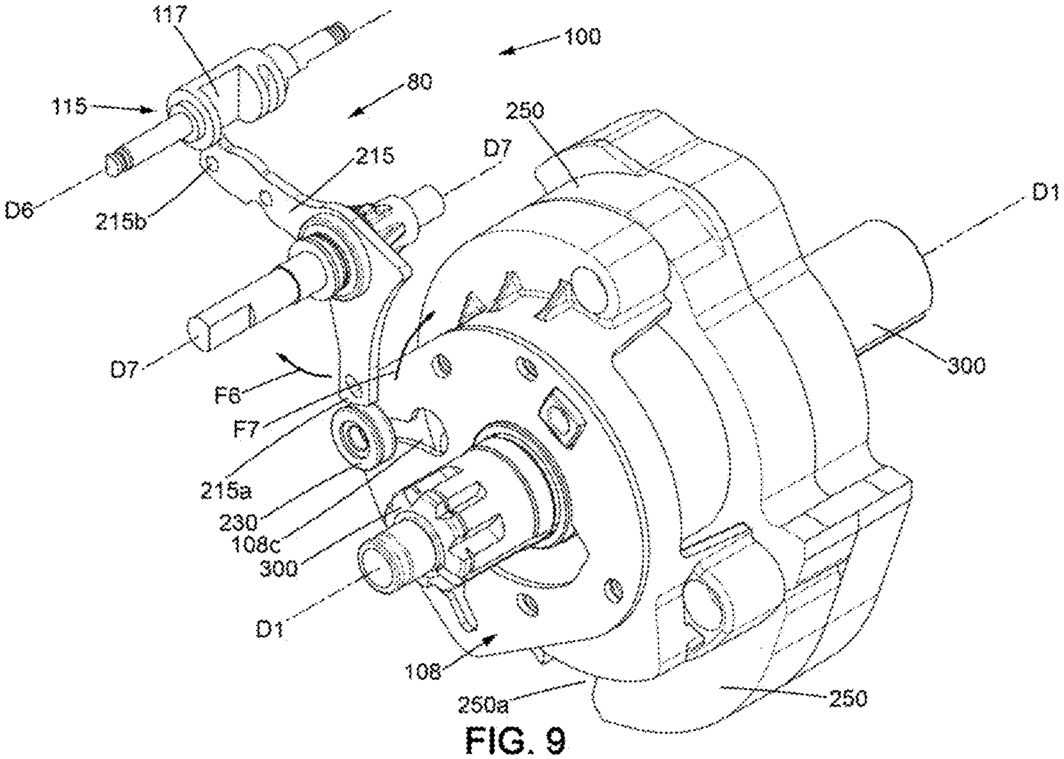
FIG. 9 is another partial perspective view of the control mechanism from FIGS. 2 to 7.

FIGS. 9 and 10 more particularly depict the components driving the movement of the mobile contacts of the current switching device 50.

The fastening device 80 of the control mechanism 100 for closing and opening a current switching device 50 shown in detail in FIG. 9 includes a rocker 115 pivoting on the frame 200.

The rocker 115 is mobile between a position retaining the control member 250 and a position freeing the control member 250.

The rocker 115 is connected to the closing lever 109 by a connecting link 120.

The control mechanism 100 includes a closing disc 108 attached to the control member 250 and pivoting on the arming shaft 300. The subassembly formed by the closing disc 108 and the control member 250 therefore pivots on the arming shaft 300. The closing disc 108 and the control member 250 both pivot relative to the arming shaft 300 and are axially offset relative to one another along the arming shaft 300. The closing spiral spring 106, seen in FIG. 10, has a central end 106*a* fastened to the arming shaft 300 and a peripheral end 106*b* fastened to the control member 250.

The closing disc 108 includes a retaining roller 230. The retaining roller 230 is able to slide in a radial slot 108*c* in the closing disc 108.

The closing disc 108 and the arming disc 107 are coaxial and offset relative to one another along the arming shaft 300. Comparing FIGS. 8 and 9 shows this offset in the direction along which the arming shaft extends axially.

The fastening device 80 includes an activation lever 215 that is able to rotate about an axis D7.

The activation lever 215 is configured selectively to retain in position the closing disc 108 against the effect of the closing spiral spring 106 or to free the closing disc 108 so as to enable it to be rotated because of the effect of the closing spiral spring 106.

To this end a first end 215*a* of the activation lever 215 is configured to be in contact with the closing disc 108 and a second end 215*b* of the activation lever 215 is configured to be in contact with the rocker 115.

The control member 250 is fastened to the closing disc 108 and the combination pivots on the arming shaft 300.

The rocker 115 includes an attachment area 115*b* for the connecting link 120, seen in FIGS. 2 to 6.

As can be seen in FIG. 9 the rocker 115 also includes a half-moon 117, that is to say a semi-cylindrical portion able to pivot about an axis D6.

The activation lever 215 is generally L-shaped with a first end 215*a* and a second end 215*b*. Depending on the angular position of the rocker 115 the activation lever 215 is retained by the half-moon 117 at the level of its second end 215*b* or is able to be disengaged from the half-moon 117. In the FIG. 9 position the retaining roller 230 bears on the lever 215 at the level of its first end 215*a* and the lever 215 bears against the half-moon portion 117 of the rocker 115 at the level of its second end 215*b*. The lever 215 being immobilised by the half-moon 117 of the rocker 115, the lever 215 is not able to be turned by the effect of the torque applied by the closing spring 106. In other words, the fastening device 80 blocks rotation of the assembly comprising the closing disc 108 and the control member 250 because of the action of the closing spring 106. FIG. 9 represents the mobile fastening device 80 in the first position, in which the control member 250 is held immobile.

When the closing lever 109 drives the rocker 115 in rotation via the connecting link 120 the second end 215*b* of the activation lever 215 is disengaged from the half-moon 117. The activation lever 215 is then able to pivot about the axis D7 because of the effect of the torque applied at the level of the first end 215*a* by the retaining roller 230 because of the effect of the tension in the closing spring 106.

The arrow F6 schematically represents the direction of rotation of the activation lever 215 because of the effect of the torque applied by the closing spring 106 via the roller 230. The assembly formed by the closing disc 108 and the control member 250 pivots in the rotation direction indicated by the arrow F7.

The control member 250 therefore causes the contacts 21, 22, 23 to pivot, which enables the passage of current in the electrical device 10. To this end an opening 250*a* in the control member 250 in the form of a slot actuates a kinematic connection 90 connected to the contacts 21, 22, 23.

The kinematic connection 90 between the control member 250 and the contacts 21, 22, 23 is not represented in detail and is represented schematically in FIG. 10.

FIGS. 2 to 6 more particularly depict components of the control mechanism 100 for controlling the fastening device 80 to free the control member 250.

The loading pawl 213 includes a first thrust area 213*f* configured to constrain the second elastic member 112 when the arming disc 107 goes from the first position P1 to the second position P2.

The second elastic member 112 is therefore able to exert sufficient force to cause the loading pawl 213 to pivot once the arming disc 107 is retained by the retaining end stop 217.

The first thrust area 213*f* is at a distance from the second elastic member 112 when the arming disc 107 is in the first position P1 called the rest position.

The first thrust area 213*f* is at a distance from the second elastic member 112 over a first part of the movement of the arming disc 107 from the first position P1 called the rest position to the second position P2 called the arming position.

Figure 2:
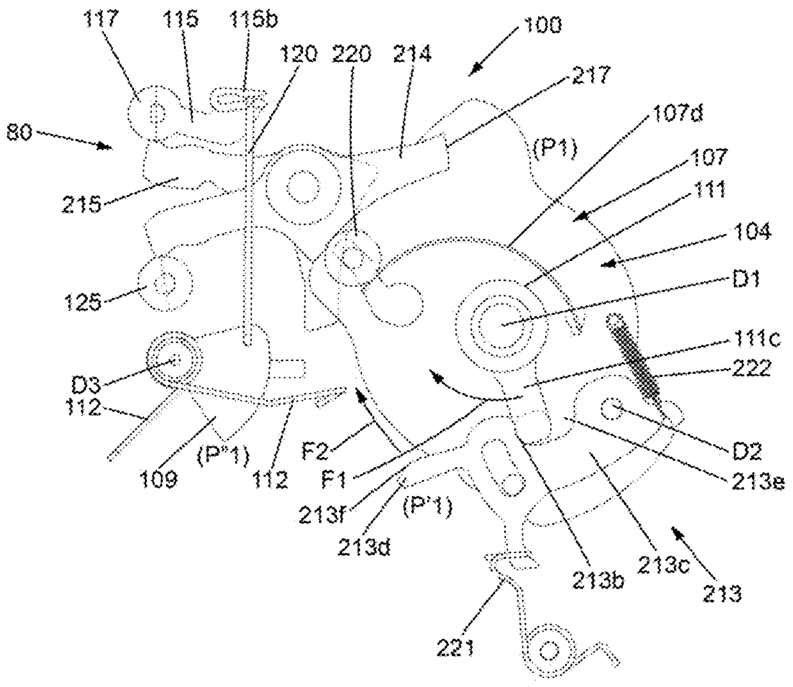
FIG. 2 is a partial side view of a control mechanism in accordance with the invention, the control mechanism being in a first configuration.

In other words, the loading pawl 213 is not in contact with the second elastic member 112 when the arming disc 107 is in the first position P1 or during an initial phase of the movement of the arming disc 107. FIG. 2 corresponds to this state.

The loading pawl 213 includes a second thrust area 213*g* configured to drive the closing lever 109 when the loading pawl 213 goes from the driving position P'1 to the free position P'2.

The second thrust area 213*g* is configured to exert thrust on the closing lever 109 when the loading pawl 213 goes from the driving position P'1 to the free position P'2 so as to cause the closing lever 109 to pivot. The closing lever 109 is able to pivot about the pivot axis D3.

The first thrust area 213*f* is formed by a first portion of a hook 213*d* projecting from a body 213*c* of the loading pawl 213. The second thrust area 213*g* is formed by a second portion of the hook 213*d* projecting from the body 213*c* of the loading pawl 213.

The first thrust area 213*f* and the second thrust area 213*g* are disposed on opposite edges of the hook 213*d* projecting from the body 213*c* of the loading pawl 213.

The closing lever 109 includes a bearing area 109*a* configured to receive thrust from the second thrust area 213*g* of the loading pawl 213 because of the action of the second elastic member 112.

The bearing area 109*a* of the closing lever 109 lies in a plane parallel to the pivot axis D3 of the closing lever 109. In accordance with the example depicted here the bearing area 109*a* of the closing lever 109 lies in a plane passing through the pivot axis D3.

The general shape of the closing lever 109 is that of an angular sector the apex of which substantially coincides with the rotation axis D3.

The control mechanism 100 includes a rocker 115 configured to drive the fastening device 80 and thereby to cause closing of the current switching device 50.

The rocker 115 pivots on the frame 200. The rocker 115 is connected to the closing lever 109 by a connecting link 120. The rocker 115 is configured to drive the fastening device 80 and thereby to cause closing of the current switching device 50.

The rocker 115 has a long shape and is able to pivot about an axis D6 at a distance from each end of the rocker 115.

Figure 6:
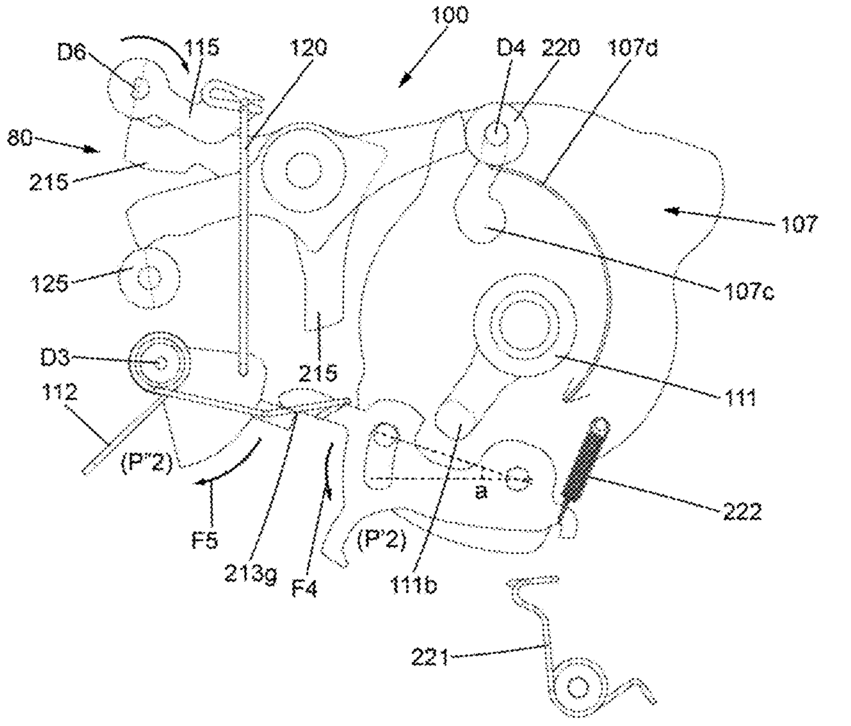
FIG. 6 is a partial side view of the control mechanism from FIG. 2, the control mechanism being in a fifth configuration.

The loading pawl 213 goes from the first position P'1 called the driving position to the second position P'2 called the free position by a pivoting movement. The angular amplitude a of the pivoting travel of the loading pawl 213 relative to the arming disc 107 is between 5° and 40° inclusive. This angular amplitude a of the movement of the loading pawl 213 about the axis D2 is schematically represented in FIG. 6.

Figure 7:
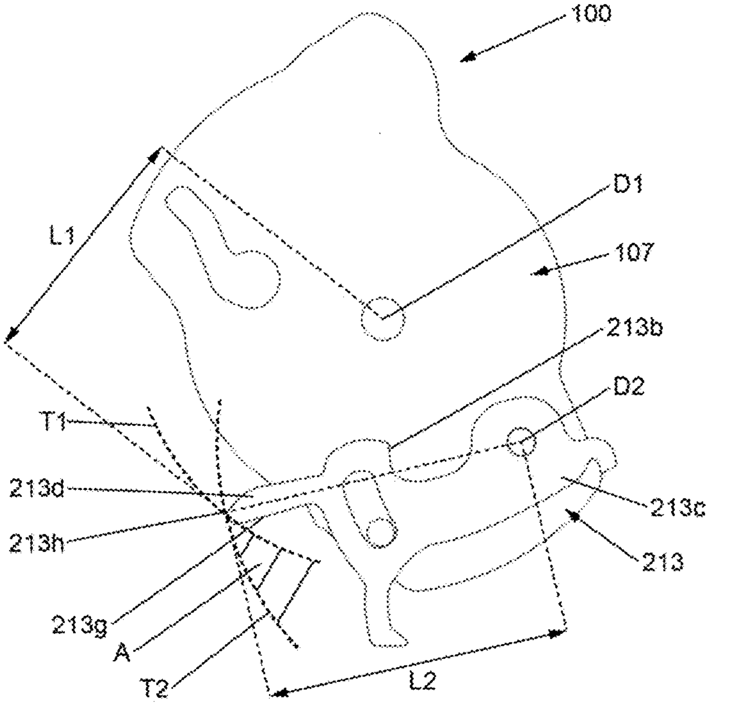
FIG. 7 is a partial side view of the control mechanism from FIG. 2, the control mechanism being in a sixth configuration.

As represented in FIG. 7, the distance L1 between a distal end 213*h* of the hook 213*d* projecting from the body 213*c* of the loading pawl 213 and the pivot axis D1 of the arming disc 107 is less than the distance L2 between the distal end 213*h* of the hook 213*d* projecting from the body 213*c* of the loading pawl 213 and the pivot axis D2 of the loading pawl 213 relative to the arming disc 107.

Thanks to this, the arming disc 107 is able to pass from the rest position P1 to the arming position P2 without the loading pawl 213 touching the closing lever 109. Conversely, when the loading pawl 213 pivots from the driving position P'1 to the free position P'2 because of the action of the second elastic member 112 the loading pawl 213 encounters the closing lever 109 and causes the latter to pivot. The closing lever 109 therefore causes the rocker 115 to pivot because of the effect of the traction generated by the connecting link 120.

In FIG. 7 the dashed line T1 schematically represents the trajectory of the distal end 213*h* of the hook 213*d* during rotation of the arming disc 107 about the axis D1. The dashed line T2 schematically represents the trajectory of the distal end 213*h* of the hook 213*d* during rotation of the loading pawl 213 about the axis D2.

The cross-hatched area A indicates the area in which the trajectory T2 is at a greater distance from the axis D1 than the trajectory T1, which enables the loading pawl 213 not to touch the closing lever 109 during rotation of the arming disc in the rotation direction indicated by the arrow F2 and to actuate the closing lever 109 during the rotation of the loading pawl 213 in the rotation direction indicated by the arrow F4.

The loading pawl 213 includes a housing 213*e* configured to receive the driving pin 111*c* of the arming lever 111 so as to drive the loading pawl 213 and to cause the arming disc 107 to go from the first position P1 to the second position P2.

The presence of the housing 213*e* and the pivot connection between the loading pawl 213 and the arming disc 107 enable selective engagement of the arming lever 111 with the loading pawl 213. Accordingly, depending on the angular position of the loading pawl 213 relative to the arming disc 107, the driving pin 111*c* of the arming lever 111 is able to be engaged in the housing 213*e* and to enable the arming lever 111 to drive the arming disc 107 or to leave the driving pin 111 free relative to the arming disc 107.

The housing 213*e* includes an engagement wall 213*b* extending in a direction A1 substantially radial relative to the arming disc 107. The driving pin 111*c* is in contact with the engagement wall 213*b* when the loading pawl 213 is driven.

Figure 5:
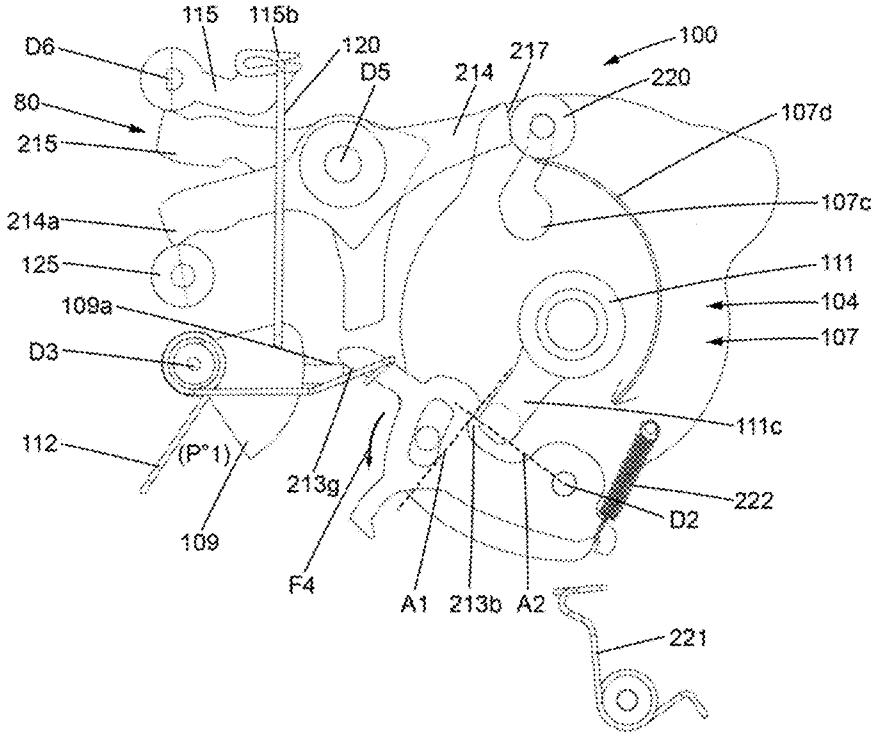
FIG. 5 is a partial side view of a control mechanism from FIG. 2, the control mechanism being in a fourth configuration.

As highlighted in FIG. 5, the engagement wall 213*b* extends in a direction A1 substantially perpendicular to a straight line segment A2 joining the engagement wall 213*b* and the pivot axis D2 of the loading pawl 213 relative to the arming disc 107. The engagement wall 213*b* therefore extends in a direction A1 substantially parallel to the direction in which the driving pin 111*c* extends.

Thus when the driving pin 111*c* drives the arming disc 107 via the loading pawl 213 the friction force between the driving pin 111*c* and the loading pawl 213 exerts a high retaining torque of the loading pawl 213 relative to the arming disc 107, which tends to prevent the loading pawl 213 pivoting relative to the arming disc 107. This enables the driving pin 111*c* to remain in contact with the loading pawl 213 for as long as the arming lever 111 exerts a driving torque on the loading pawl 213, that is to say throughout the travel along which the arming disc 107 is driven.

The second elastic member 112 is a torsion spring. Here the second elastic member 112 is coaxial with the closing lever 109. The torsion spring 112 includes two rectilinear ends connected by a winding consisting of concentric turns.

The second elastic member 112 is for example preconstrained when mounted.

The arming disc 107 includes a roller 220 configured to roll along the perimeter of a fastening lever 214 when the arming disc 107 goes from the first position P1 to the second position P2. The retaining end stop 217 is defined by a portion of the perimeter of the fastening lever 214 on which the roller 220 is able to come to bear.

The profile imparted to the perimeter of the fastening lever 214 makes it possible to create a retaining end stop that does not limit the movement of the arming disc 107 when the latter goes from the rest position P1 to the arming position P2 but prevents the arming disc 107 from returning to the rest position P1 once the arming position P2 is reached.

The fastening lever 214 has a long general shape and is able to pivot about an axis D5 at a distance from each end. A portion 214*c* of the perimeter of the fastening lever 214 forms a rolling surface for the roller 220, in the manner of a cam path.

The roller 220 has a rotation axis D4. The rotation axis D4 of the roller 220 of the arming disc 107 is parallel to the rotation axis D1 of the arming disc 107.

The portion of the perimeter of the fastening lever 214 forming the retaining end stop 217 for the roller 220 of the arming disc 107 extends in a direction A3 substantially parallel to a radial direction of the arming disc 107.

The control mechanism 100 includes an anti-rotation end stop 125 configured to block rotation of the fastening lever 214 when the arming disc 107 goes from the first position P1 to the second position P2.

Here the anti-rotation end stop 125 is half-moon shape. One end 214*a* of the fastening lever 214 opposite the retaining end stop 217 with respect to the pivot axis D5 of the fastening lever 214 bears on the anti-rotation end stop 125, which prevents the fastening lever 214 from being turned by the thrust exerted by the roller 220.

The axle of the roller 220 is able to slide in a slot 107*c* of the arming disc 107, constraining a return elastic element.

The control mechanism 100 includes a first return spring 221 acting on the loading pawl 213 configured to retain the loading pawl 213 in the driving position P'1 when the arming disc 107 is in the first position P1 called the rest position.

The control mechanism 100 includes a second return spring 222 acting on the loading pawl 213 configured to retain the loading pawl 213 in the free position P'2 when the arming disc 107 goes from the second position P2 to the first position P1.

The pivot axes D1, D2, D3, D4, D5, D6 and D7 are parallel to one another.

FIGS. 2 to 6 represent different successive phases of a manoeuvre of the control mechanism 100 aiming to close the electrical circuit of the electrical device 10 in order to enable a flow of current. The views 2 to 6 are in chronological order.

FIG. 2 depicts the initial position of the various components of the control mechanism 100 at the beginning of the manoeuvre to close the electrical circuit.

The arming lever 111 is already inserted in the arming shaft 300; the step of inserting the arming lever 111 in the arming shaft 300 has not been represented.

In FIG. 2 the first return spring 221 is in contact with the loading pawl 213 and retains the loading pawl 213 in the driving position P'1. The driving pin 111*c* of the arming lever 111 is engaged in the housing 213*e* of the loading pawl 213 and the edge of the pin 111*c* bears against the surface 213*b* of the loading pawl 213.

The arrow F1 indicates the torque applied to the arming lever 111 by the operator performing the operation of closing the circuit. The arrow F2 indicates the direction of rotation of the arming disc 107 as a result of the torque applied to the arming lever 111.

The roller 220 rolls on the perimeter of the fastening lever 214 during the movement of the arming disc 107.

The hook 213*d* of the loading pawl 213 is at a distance from the second elastic member 112.

Figure 3:
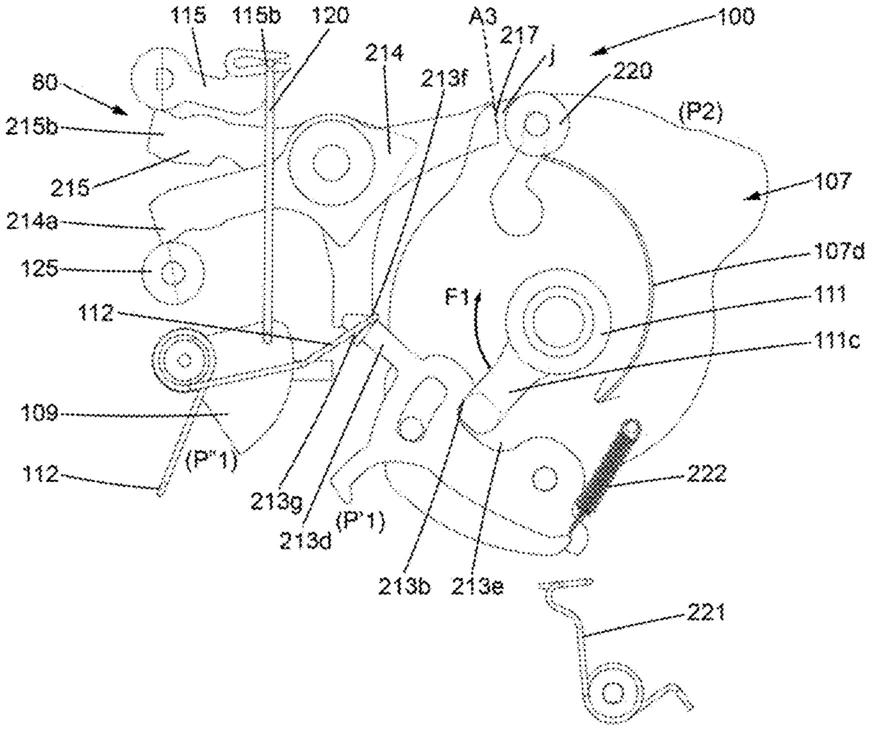
FIG. 3 is a partial side view of a control mechanism in accordance with the invention, the control mechanism being in a second configuration.

FIG. 3 depicts the position of the various components of the control mechanism 100 at the end of the movement of the arming lever 111, that is to say when the amplitude of the movement is maximum. In this position the operator exerts a torque on the arming lever 111 so as to retain the arming disc 107 in the position corresponding to the maximum movement, against the effect of the first elastic member 104.

The second elastic member 112 is constrained by the loading pawl 213. In fact, the first thrust area 213*f* of the hook 213*d* is engaged with one end of the second elastic member 112. The second elastic member 112 exerts on the loading pawl 213 a force tending to cause the latter to turn anticlockwise as seen in the figure but such movement in rotation is not possible because the friction force exerted between the pin 111*c* and the loading pawl 213 at the level of the bearing surface 213*b* generates a torque greater than that generated by the second elastic member 112. As before, the arrow F1 indicates the torque applied by the operator to the arming lever 111.

A clearance j exists between the roller 220 and the end of the lever 214 forming the retaining end stop 217. The roller 220 faces the retaining end stop 217 without being in contact with it. The clearance j characterises the overtravel of the arming disc 107 relative to the minimum travel enabling the roller 220 to come to bear on the retaining end stop 217.

Figure 4:
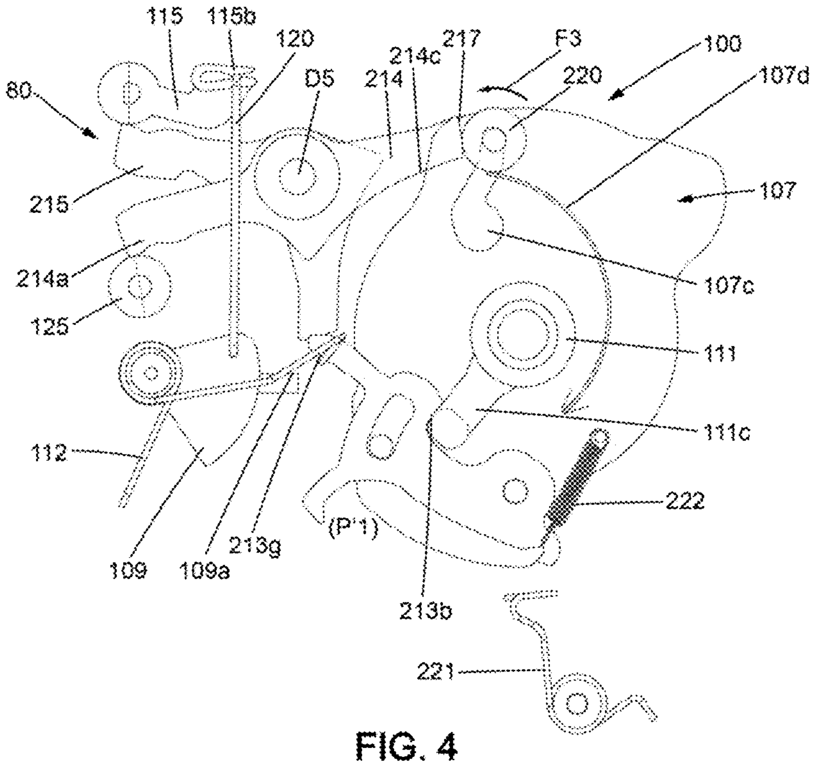
FIG. 4 is a partial side view of a control mechanism in accordance with the invention, the control mechanism being in a third configuration.

FIG. 4 depicts the position of the various components once the operator has begun to release the force applied to the arming lever 11.

The torque applied by the operator to the arming lever 111 becomes less than the torque exerted by the first elastic member 104. The arming disc 107 turns in the direction of rotation indicated by the arrow F3, that is to say the anticlockwise direction in the figure, until the roller 220 comes to bear on the end stop surface 217. The end stop surface 217 therefore takes up the torque exerted by the first elastic member 104. The torque retaining the loading portion 213 generated by the friction force between the driving pin 111*c* and the engagement wall 213*b* becomes less than the torque 5 exerted by the second elastic member 112. The loading pawl 213 is therefore able to begin to pivot.

FIG. 5 depicts the position of the various components during the pivoting of the loading pawl 213.

Because of the effect of the thrust of the second elastic member 112 the loading pawl 213 pivots about its pivot axis D2 as indicated by the arrow F4. The second thrust area 213*g* of the loading pawl 213 approaches the bearing area 109*a* of the closing lever 109.

The arming disc 107 is immobile, the roller 220 still bearing on the retaining end stop 217.

FIG. 6 depicts the position of the various components at the end of pivoting of the loading pawl 213 and shows the pivoting of the control lever 109 and the associated triggering of the fastening device 80.

The second thrust area 213*g* exerts thrust on the bearing surface 109*a* which causes the closing lever 109 to pivot as schematically represented by the arrow F5. The closing lever 109 drives the rocker 115 in rotation via the connecting link 120.

The rocker 115 activates the fastening device 80, that is to say frees the activation lever 215, which enables the control member 250 to trigger the rotation of the three mobile contacts 21, 22, 23.

The arming disc 107 is immobile, the roller 220 still bearing on the retaining end stop 217. The arrow F4 depicts as before the direction of pivoting of the loading pawl 213.

The closing of the contacts 21, 22, 23 can be triggered only if the roller 220 has passed the retaining end stop 217, that is to say only if the movement applied to the arming lever corresponds to the intended total travel. Unwanted closing by a movement of small amplitude is therefore not possible.

Operation is identical for the variant embodiments in which the arming lever 111 is moved by an electric motor. An electronic control module manages the application of the torque and the amplitude of movement of the electric motor.

The invention claimed is:

1. A closing and opening control mechanism of a current switching device, the mechanism including:

an arming lever, an arming shaft pivoted on a frame, a first elastic member including a closing spiral spring having a central end fastened to the arming shaft and a peripheral end fastened to a control member connected to the current switching device, an arming disc fastened to the arming shaft mobile between a rest position and an arming position, a loading pawl pivoted on the arming disc, the loading pawl being able to go from a driving position in which the arming lever drives the arming disc via the loading pawl to a free position in which the arming lever is free to rotate relative to the arming disc, in which rotation of the arming lever in a first rotation direction called a arming direction causes the arming disc to go from the rest position to the arming position, constraining the first elastic member, a retaining end stop configured to retain the arming disc once the arming disc has reached the arming position and a torque applied to the arming disc by the arming lever becomes less than the torque supplied by the first elastic member, a fastening device mobile between a fastened position in which the control member is held immobile and a moveable position in which the control member is able to move because of a action of the closing spiral spring, a closing lever pivoted on the frame configured to cause the fastening device to go from the fastened position to the moveable position and thereby to cause closing of the current switching device, a second elastic member configured to cause the loading pawl to go from the driving position to the free position when the arming disc is retained by the retaining end stop, in which the loading pawl is configured to drive the closing lever from the fastened position to the moveable position when the loading pawl goes from the driving position to the free position so as to cause closing of the current switching device.

2. The control mechanism according to claim 1 wherein the loading pawl includes a first thrust area configured to constrain the second elastic member when the arming disc goes from the rest position to the arming position.

3. The control mechanism according to claim 2 wherein the loading pawl includes a second thrust area configured to drive the closing lever when the loading pawl goes from the driving position to the free position.

4. The control mechanism according to claim 3 wherein the closing lever includes a bearing area configured to receive thrust from the second thrust area of the loading pawl because of an action of the second elastic member, and wherein the bearing area of the closing lever lies in a plane parallel to the pivot axis of the closing lever.

5. The control mechanism according to claim 4 wherein the fastening device includes a rocker pivoted on the frame, the rocker being mobile between a retained position retaining the control member and an unretained position freeing the control member, and wherein the rocker is connected to the closing lever by a connecting link.

6. The control mechanism according to claim 3, wherein the first thrust area is formed by a first portion of a hook projecting from a body of the loading pawl, wherein the second thrust area is formed by a second portion of the hook projecting from the body of the loading pawl, and wherein a distance between a distal end of the hook projecting from the body of the loading pawl and the pivot axis of the arming disc is less than a distance between the distal end of the hook projecting from the body of the loading pawl and the pivot axis of the loading pawl relative to the arming disc.

7. The control mechanism according to claim 1 wherein the loading pawl includes a housing configured to receive a driving pin of an arming lever so as to drive the loading pawl and to cause the arming disc to go from the rest position to the arming position.

8. The control mechanism according to claim 7 wherein the housing includes an engagement wall extending in a direction substantially radial relative to the arming disc, the driving pin being in contact with the engagement wall when the loading pawl is driven.

9. The control mechanism according to claim 1 wherein the second elastic member is a torsion spring, and wherein the second elastic member is coaxial with the closing lever.

10. The control mechanism according to claim 1 wherein the arming disc includes a roller configured to roll along a perimeter of a fastening lever when the arming disc goes from the rest position to the arming position, the retaining end stop being defined by a portion of the perimeter of the fastening lever on which the roller is able to come to bear, and wherein a rotation axis of the roller of the arming disc is parallel to the rotation axis of the arming disc.

11. The control mechanism according to claim 1 wherein the control mechanism includes a first return spring for the loading pawl configured to retain the loading pawl in the driving position when the arming disc is in the rest position, and wherein the control mechanism includes a second return spring for the loading pawl configured to retain the loading pawl in the free position when the arming disc goes from the arming position to the rest position.

12. A current switching device including the control mechanism according to claim 1.

13. An electrical device including the current switching device according to claim 12, the current switching device being adapted selectively to allow or to prohibit the flow of current in the electrical device.

* * * * *